May 17, 1949. J. M. STRYHAL 2,470,530
GRINDING BLOCK ARRANGEMENT
Filed May 28, 1946 3 Sheets-Sheet 1
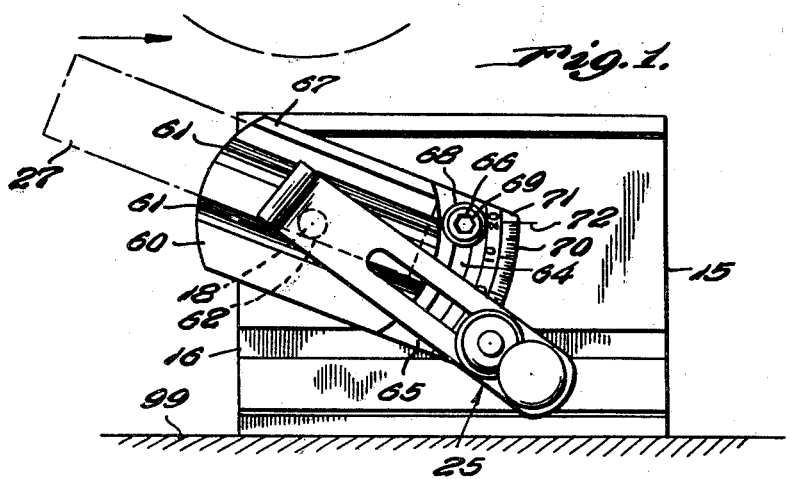
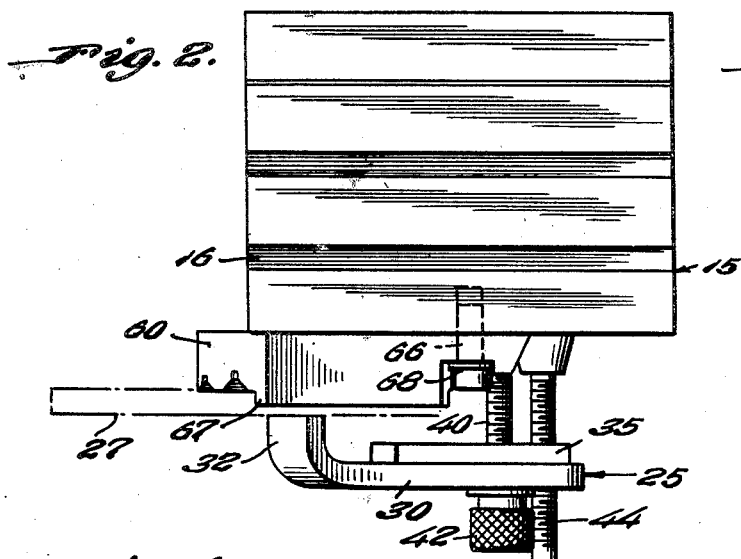
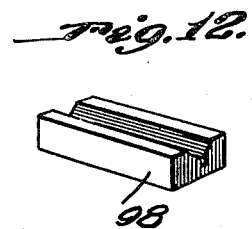
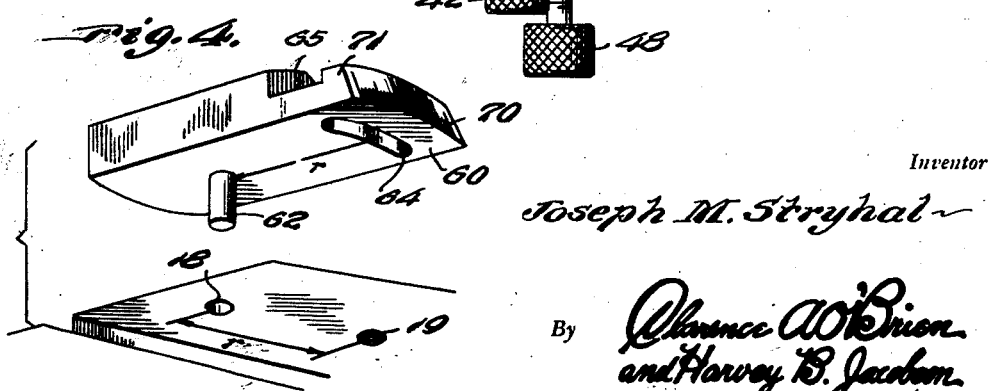
Inventor
Joseph M. Stryhal
By Clarence A. O'Brien
and Harvey B. Jackson
Attorneys May 17, 1949.  J. M. STRYHAL  2,470,530
GRINDING BLOCK ARRANGEMENT
Filed May 28, 1946  3 Sheets-Sheet 2

Inventor
Joseph M. Stryhal
By Clarence A. O'Brien
and Harvey B. Jacobson
Attorneys May 17, 1949.　　　　　J. M. STRYHAL　　　　　2,470,530
GRINDING BLOCK ARRANGEMENT
Filed May 28, 1946　　　　　　　　　　　　3 Sheets-Sheet 3
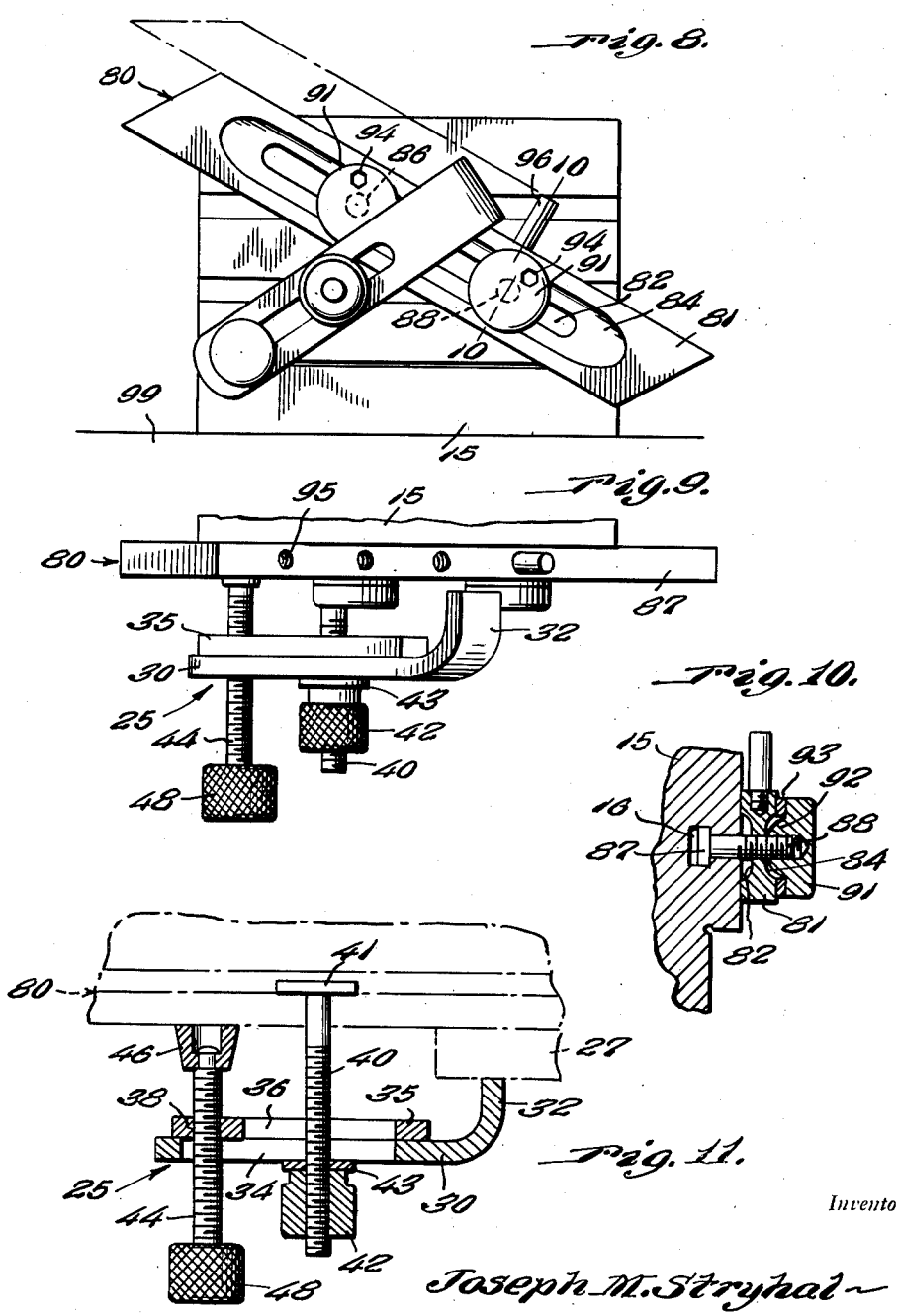
Inventor
Joseph M. Stryhal
By Clarence A. O'Brien
and Harvey B. Jacobson
Attorneys Patented May 17, 1949

2,470,530

UNITED STATES PATENT OFFICE 2,470,530

GRINDING BLOCK ARRANGEMENT

Joseph M. Stryhal, Miami, Fla.

Application May 28, 1946, Serial No. 672,731

3 Claims. (Cl. 51—217)

This invention relates to arrangements for holding workpieces or tools in their position before a surface grinding wheel or any other machining appliance or tool and it has for its principal object to provide means whereby workpieces or tools may be held at any angular or other operative position with the greatest precision and accuracy and may be mounted and fixed in this position with great speed and with a minimum of time consumption.

A further object of the invention consists in providing simple means, such as a prismatic grinding block with grooves of various shape, which are adapted to serve as a support for the work piece or tool to be worked on and which are simultaneously adapted to act as a carrier support and fixation means for various auxiliary devices such as clamping devices for the fixation of the work piece, angle supports, angle stops, supporting stops and the like, which are adjustable within the widest possible range and which serve to fix, hold or support the work piece in any desired position with the greatest precision.

A further object of the invention consists in providing the block with grooves, holes and other means permitting slidability and fixation of clamping means, angle plates and angle supports, having members capable of pivotal adjustment, in various positions in which they may hold or support the work piece.

A further object of the invention consists in providing a block with negative or recessed parallel holding means for adjustable clamping devices and angle supports, which devices are provided with holding means adapted to slide within the recessed block and by virtue of such sliding and by virtue of their own adjustability are capable of adopting any position necessary to clamp, hold, support or fix a work piece or tool on any spot on the block and in any angular position thereto with great precision, the adjustment entailing a minimum of manipulation.

A still further object of the invention consists in providing means for fixing the position of the work piece, in such a manner that a number of work pieces ground or machined in succession will be in an identical position with respect to the machining tool or wheel.

Further objects of the invention may be gathered from the following detailed specification.

The invention will be described with reference to the accompanying drawings illustrating one modification of the invention. It is, however, to be understood the the fact that only one modification of the invention is shown is not to be understood as being limitative. The invention is shown in a specific form by way of example in order to illustrate an embodiment thereof fit for practical use. But it is also described in such terms as to foreshadow for the expert skilled in the art further embodiments of the same. These further embodiments of the invention as far as they are included in the annexed claims are, therefore, not a departure from the invention but are a part thereof.

In the accompanying drawings:

Figure 1 is an elevational view of one side of the grinding block with an adjustable graduated swivel block and an adjustable clamp holding a work piece mounted and held thereon.

Figure 2 is a plan view of the block with auxiliary parts such as shown in Figure 1 mounted thereon.

These three figures are views taken at right angle to each other. It is to be understood, however, that the block may be used in any position, and that the terms side view, front view and plan view are, therefore, interchangeable. In the following description the side shown in Figure 3 will be regarded as the top or bottom portion of the block, while the faces shown in Figures 1 and 2 will be regarded as the side faces.

Figure 4 is a perspective view of the swivel block when seen from below and of a portion of the side face.

Figures 5, 6:
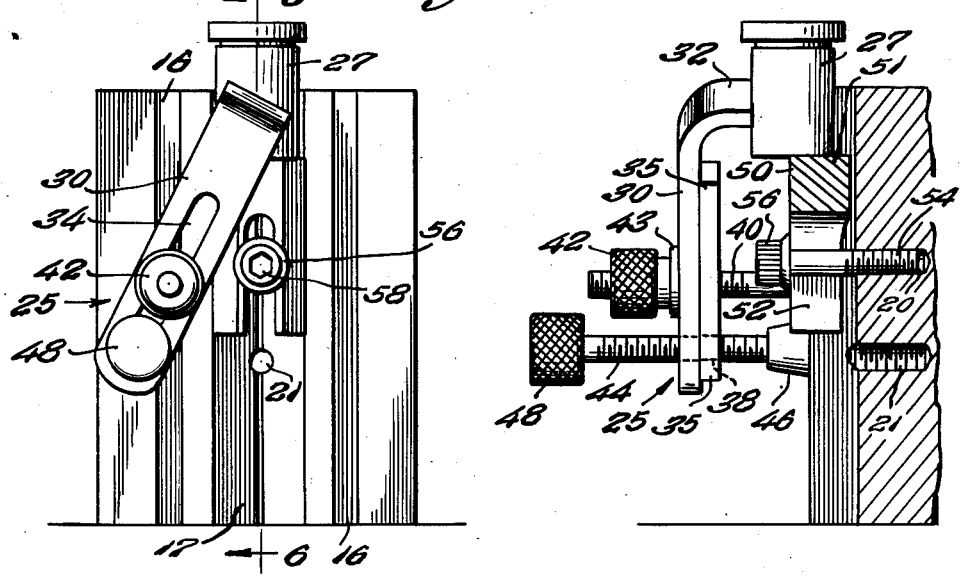

Figure 5 is an elevational side view of the block with one of the clamping devices and one of the adjustable stops mounted thereon provided with V-shaped supporting faces fitting into the V-grooves of the block.

Figure 6 is a sectional elevational view of the same parts the section being taken along line 6—6 of Figure 5.

Figure 7:
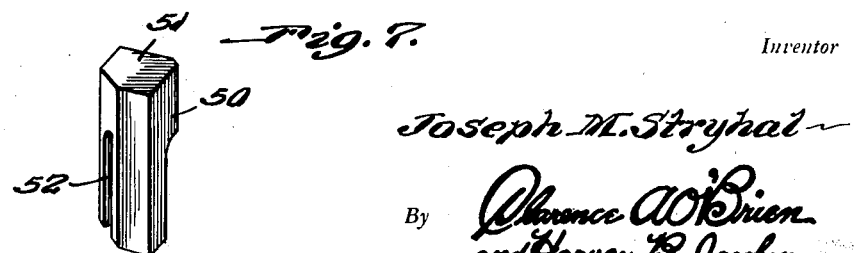

Figure 7 is a perspective view of the adjustable stop.

Figure 8 is a side view of the block, supported on one of its sides and carrying a clamping device and an adjustable angle stop which is mounted thereon.

Figure 9 is a partial plan view of the arrangement shown in Figure 8.

Figure 10 is a sectional plan view of a portion of the block and of a portion of the angle stop, showing the way in which the angle stop is fixed.

Figure 11 is a plan view of a clamping device.

Figure 12 is a perspective view of a small block support provided with a V-groove serving as a bed for the work piece or tool when clamped to the block, and preferably used for the clamping of round or other small pieces.

Figure 3:
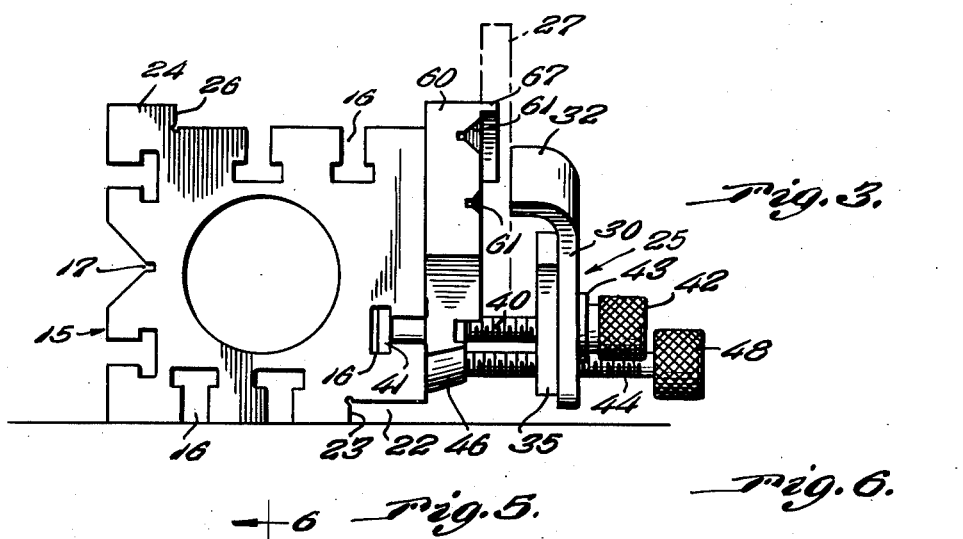
Figure 3 is an elevational front view of the block with the parts shown in Figure 1 mounted thereon.

As will be seen from Figures 1 and 3, the grinding block 15 consists of steel and is of substantially prismatic shape, having a square or a rectangular cross section. The block is provided with T-shaped grooves 16 (Figure 3) and with V-shaped grooves 17. These grooves run along the sides of the prismatic body, each side being provided with either one groove or with a plurality of grooves. Moreover, the block is provided with a number of holes 18, 19, 20, 21, some of them, for instance, 19, 20, 21 being provided with internal screw threads while others are smooth. These holes are provided for a purpose described below.

The block may moreover be provided with a recessed portion 22 bordered by a straight edge 23 (Figure 3) which acts as a stop or guide, or with a protruding portion 24 whose edge 26 acts in a similar way.

The block 15 cooperates with clamping devices 25 adapted to hold a work piece 27 or tool in the desired position. This clamping device which is shown in Figures 5, 6, 9 and 11 consists of the clamping arm 30 and is provided with a clamping tongue or jaw 32. The arm is preferably slotted, as shown at 34. Behind the clamping arm 30 is a counter plate 35, which is provided with a slot 36 and with a threaded bore 38. Through the two slots 34 and 36 the adjustable fixation or clamping screw 40 of the clamping device passes. This screw carries a T-head 41 of a width fitting the width of the T-slots 16 (Figure 3) while the length of the head 41 may be much larger (Figure 11) as this head is inserted lengthwise into the slot. A milled nut 42 and, if desired, a washer 43 is carried by the fixation screw at its free end.

Through the threaded bore 38 of the counter plate 35 a counter pressure exerting screw bolt 44 passes which is provided with a pressure head 46 rotatably fixed on the bolt by means of a rivet or the like. This screw bolt also passes through the slot 34 of the clamping arm 30 and carries a milled head 48 at its front end.

The clamping device 25 as will be clear from Figures 3, 5, 6, 9, and 11 may be brought into any position which may be necessary to grip or clamp a work piece 27 or a work piece support or the like, as the clamping arm 30 may freely turn around the screw bolt 40 passing through its slot, while the screw bolt itself may engage any one of the T-grooves 16 and may slide therein. It is, therefore, possible to firmly grip and hold a round work piece 27 within the V-groove 17, for instance, by introducing the T-head 41 of the clamping screw 40 into one of the T-shaped grooves 16 near the V-shaped groove, in bringing the clamping arm into an inclined position in which the clamping jaw 32 faces the V-shaped groove and in gripping a work piece 27, say of cylindrical shape, firmly between the two inclined faces of the V-groove and the jaw 32 of the clamping device 25 (Figures 5 and 6).

The latter operation is performed by sliding the clamping screw whose head is held in the T-groove to the appropriate place, by turning the clamping arm 30 into the desired position and by turning the nut 42 of the clamping screw for first fixation. The counter pressure screw 44 is then applied, until the desired clamping pressure is reached. Obviously conditions are at an optimum when the clamping arm is parallel to the side of the block, but this adjustment is, as a rule, not critical.

Where a large number of identical work pieces has to be ground in the same way, it is obviously of advantage to fix the position of such a work piece in such a manner that the pieces worked on in succession are brought into exactly the same position on the grinding block and may be clamped with the least possible effort. To obtain this result a support member 50 (Figure 7) is used, which in this special example, is adapted to fit into the V-shaped groove 17. The upper end 51 of this member, as seen in Figure 6, forms the support for the work piece 27, which may be placed on it and which, therefore, together with the side faces of the V-shaped groove 17, defines the three planes fixing the position of the work piece.

In order to be able to adjust the position of the support piece 50, the said piece is provided with a slot 52, through which a screw bolt 54 may pass. The end of the screw bolt is provided with a milled head 56. When the milled head is small a hexagonal or square hole 58 may be machined into the head which may engage a hexagonal or square key by means of which the screw bolt may be screwed tightly into one of the screw threaded holes 20, 21 provided for this purpose. Only two such holes are shown but any number may be provided capable of providing fixation means for the support 50. It will be obvious that each hole permits to adjust the support in any position located within a rather wide zone.

A further appliance to be used in connection with the grinding block consists in an adjustable angular swivel block 60 (Figures 1, 2, 3 and 4). This swivel block is a small separate unit with a front side provided with a number of V-shaped grooves 61 for holding work pieces, tools or their support and with a stop ledge 67. It moreover carries a pivot 62 on its under side which may engage one of the smooth holes 18 provided in the grinding block 15. This pivot forms an axis around which the swivel block may be rotated.

The swivel block 60 is moreover provided with an arcuate slot 64 preferably located in a flat recessed portion 65 near the end of the block. This arcuate slot forms part of a circle which is centered in the axis of pivot 62. Below each hole 18 in the grinding block 15 a second threaded hole 19 (Figure 4) is provided at a distance equal to the radius of the above named arc circle. Into this threaded hole a screw bolt 66 is inserted which projects through the arcuate slot 64. The screw bolt 66 is provided with a head 68 of a size fitting into the recessed portion 65. This head either projects sufficiently beyond the recess 65 to permit its manipulation by hand or is provided with a square or hexagonal hole 69 as shown, into which a key (not shown) may be inserted.

The lower or foremost portion 71 of the swivel block which projects beyond the recessed portion is provided with a graduation scale 70 indicating angular displacement with respect to the vertical axis of the grinding block. A mark 72 in the grinding block indicates the extent of such displacement.

In order to hold a work piece at an angle with respect to the vertical (or horizontal) axis of the block 15 the swivel block is inserted with its pivot 62 into one of the holes 18 and screw bolt 66 is passed through the slot 64 and is screwed lightly into hole 19. Then the operator with the help of the graduated scale 79 adjusts the angle at which the V-shaped grooves in the front side of the swivel block are running with respect to the vertical (or horizontal) axis of the grinding block. The screw bolt 66 is then tightened so that the position of the swivel block 60 on the grinding block 15 is fixed.

Now one of the clamping devices 25 is mounted in one of the T-shaped grooves 16 of the grinding block adjacent to the swivel block, the work piece 27 (shown in dotted lines in Figures 1, 2 and 3) is placed upon the swivel block in contact with the top ledge 67, or is placed into and is held in one of the V-shaped grooves and is clamped in this position by means of the clamping device 25.

Another device used in connection with the above described grinding block is the adjustable angle stop or angle holder 80 illustrated in Figures 8 to 10. It consists of a flat approximately rectangular or rhombic holding and supporting piece 81 provided with a slot 82. The slotted middle portion of the holding piece may be provided with a recessed portion 84 as clearly shown in Figure 10 extending along and around the slot 82. Fixation screws 86, 88 are passing through the slots. They are provided with T-heads 87 of a width fitting into the T-shaped grooves 16 of the grinding block 15 and the ends projecting outwardly are fitted with nuts in the shape of circular disks 91 with a spherical bottom 92 fitting into the recess 84. A ring 93 may be used as a washer. The disk 91 may have a milled edge or may be provided with hexagonal or square holes 94 so that they can be operated by a key (not shown).

The small sides of the holding piece are provided with holes 95 into which small rods or bolts 96 may be inserted, acting as stops for the work piece placed on the holding piece.

As the angle stop is to be used in an inclined position the T-head 87 of the two screw bolts are first inserted into the T-grooves 16 of one side of the block 15. The slotted piece 81 is then slid over the protruding screw bolts 86, 89 and the nuts are provisionally screwed down on the bolts. The angle stop may then be brought into any desired position by shifting the screw bolts within the V-shaped grooves 16 and within the slot 82. When the right position has been reached, for instance, the position shown in Figure 8, the work piece 27 shown in dotted lines in the figure, is placed on the angle stop and is held back by the stop 96. The work piece is then clamped to the block by one of the clamping devices 25.

Where small work pieces are to be ground, requiring small V-shaped grooves on portions of the block where such grooves are not available, small supporting blocks 98 may be used. These are placed on the block against the straight edges 23 or 26 and serve as a support to the work piece for instance, a bolt or shaft of small diameter. They are clamped to the block together with the work piece by a clamping device 25.

The grinding block, as described, with its supplementary or auxiliary devices is used for precision grinding of work pieces. The block 15 itself is set upon a magnetic chuck 99 under a grinding wheel in the well known manner. But the block may also be bolted to a non-magnetic chuck.

Work pieces may be shaped to exact size and exact angles in less time than with known methods. Tools may also be ground more accurately and with higher speed than with known methods. Likewise, the grinding blocks may be used with advantage where many pieces of the same size and with the same angular relation of the faces have to be manufactured.

The block is, however, also usable for holding parts in drill presses for drilling perpendicular holes or holes at any angle.

It is moreover to be emphasized that the block may be equipped with holders, angle stops and the like, the details of which may differ from those shown for holding the work piece at the desired angle.

I claim:

1. A grinding block arrangement of the character described for holding work pieces and tools during the grinding operation, comprising a prismatic block, provided with T-shaped grooves running in substantial parallelism along the sides of the prismatic block, and an adjustable clamping device, provided with a pivot bolt carrying a head adapted to be inserted into and to slide in one of the T-shaped grooves of the block, a clamping arm provided with a clamping jaw and a slot, on and rotatable around said slidable pivot bolt, means on said bolt for fixing said clamping arm in the desired position, said means pressing the clamping arm and jaw towards the block a screw threaded bolt passing through the slot of the clamping arm, provided with a pressure head, adapted to press against the surface of the grinding block, a counter pressure plate provided with screw threads engaging the threads in said last-named bolt and applying pressure against the clamping arm, said plate being provided with a slot for the passage of the pivot bolt.

2. A grinding block arrangement of the character described for holding work pieces and tools during the grinding operation, comprising a prismatic block, provided with T-shaped grooves running in substantial parallelism along the sides of the prismatic block, and an adjustable clamping device provided with a clamping arm, having a clamping tongue at right angle thereto, adapted to be applied against the work piece, a clamping bolt provided with a head slidable within and fitting into said T-shaped grooves of the block, a counter plate in contact with said clamping arm extending substantially along the length of the arm for exerting the pressure on the same, a counter pressure bolt held in said counter plate, having a head adapted to be frictionally applied against said block, said clamping bolt pressing on said clamping arm for holding the work piece against said block, and said counter bolt exercising an outwardly directed pressure against said arm.

3. In a grinding block arrangement for holding work pieces and tools during the grinding operation, a prismatic block, provided with at least one T-shaped groove running in substantial parallelism to the edges of the prismatic block and further provided with holes and an adjustable clamping device provided with a clamping arm, a counter plate in contact with said arm, a clamping bolt slidable in said T-shaped groove and adapted to press said clamping arm against said work piece, and a counter pressure bolt fixed in said counter plate and pressing against said block, a swivel block provided with grooves and stops for aligning the work piece in a fixed direction on said block and further provided with a pivot, adapted to fit in one of the holes of the grinding block, an arcuate slot, a graduation scale in parallelism with said slot, a fixation means for the swivel block fixed in the grinding block and passing through the arcuate slot, adapted to fix said swivel block at the desired angle, said clamping device holding the work piece when aligned on said swivel plate.

JOSEPH M. STRYHAL.

REFERENCES CITED

The following references are of record in the file of this patent:

UNITED STATES PATENTS

| Number | Name | Date |
|---|---|---|
| 678,712 | Blood et al. | July 16, 1901 |
| 1,093,554 | Erman | Apr. 14, 1914 |
| 1,189,667 | Costello | July 4, 1916 |
| 1,689,022 | Graham | Oct. 23, 1928 |
| 2,061,718 | Stahl | Nov. 24, 1936 |
| 2,343,088 | Sherman | Feb. 29, 1944 |
| 2,365,436 | Saucier | Dec. 19, 1944 |